United States Patent Office 3,128,146
Patented Apr. 7, 1964

3,128,146
POLYOLEFIN DYEING
Joseph Bianco, Lock Haven, Pa., and Herman P. Baumann, Charlotte, N.C., assignors to American Aniline Products, Inc., a corporation of Maryland
No Drawing. Filed Oct. 11, 1961, Ser. No. 144,323
4 Claims. (Cl. 8—55)

This invention relates to the coloring of polyolefins. In one specific aspect, it relates to a novel method for dyeing polyolefins, particularly polypropylene, in the form of yarn, fabric, filaments or film.

The polymers made from lower mono-alpha olefins, particularly polypropylene, are known to have good fiber forming properties. One of the difficulties confronting the textile industry in making new fabrics from these polymers is the problem of coloration. Polypropylene and polyethylene lack the functional groups along the chain of the polymer that tend to permit dyestuffs to be absorbed or otherwise bound firmly by physical or chemical forces. Thus, the disperse dyestuffs, which as a class are very useful when applied by well-established methods to artificial fibers such as cellulose acetate, nylon and polyethylene terephthalate, have not been satisfactory for the dyeing of polyolefins.

Processes have been developed for coloring polyolefins whereby dyeing is accomplished in an organic solvent. Although it is possible to obtain a reasonably satisfactory shade of color with such techniques, the dyeing process is complicated because it is necessary to devise special methods to remove solvent from the dyed polymer. Also, the fastness of the dyestuffs when applied to polyolefins is often very poor, particularly with respect to crocking.

We have discovered a new method, involving an emulsification technique, of coloring polyolefins to provide dyeings which are surprisingly fast to light, fast to soaping and resistant to crocking.

It is, therefore, an object of the present invention to provide a new coloration process for polyolefins, particularly polypropylene, by which there can be obtained dyeings which have excellent fastness to light, soaping and crocking in shades of any desired depth. It is further an object to provide improved dyed polyolefin products, especially fibers, fabrics, filaments, film and the like.

In accordance with the invention, a polymer of a lower mono-alpha olefin, such as polypropylene, is dyed by immersing the polymer in an emulsified dye liquor at a temperature between 27° C. and the boiling point of the liquor. The dye liquor is prepared by dissolving a water-insoluble, oil-soluble dyestuff in an inert solvent selected from the group consisting of volatile liquid hydrocarbons, polar haloalkanes and polar, water-soluble amides volatile under the conditions used. The amount of dyestuff corresponds to 0.01–1% by weight of the total dye liquor and the amount of solvent corresponds to 0.05–5% by weight of the liquor. To the solvent is added, after dissolving the dyestuff therein, an aqueous emulsion of an organic phosphite selected from the group consisting of aryl phosphites, lower alkaryl phosphites, and alkyl phosphites, wherein the alkyl group has from 5–10 carbon atoms. The phosphite emulsion is made by admixing the phosphite with water and an effective quantity of an anionic or nonionic emulsifying agent. The amount of phosphite added to the solvent represents from 1–10% of the total weight of the liquor. The emulsified mixture, thus prepared, is diluted with sufficient water to provide a dye liquor having the above-indicated concentration of dyestuff.

Our novel process can be used to color any of the polymers made from the lower mono-alpha olefins, such as polypropylene or polyethylene. Because of the widespread interest in the potential of polypropylene as a textile material, the results obtained with this polymer are of particular significance. The polyolefin to be dyed can be in any form, although the greatest commercial potential of our process is in the coloration of fibers or filaments, whether in spun form, or in the form of skeins, raw stock or piece goods.

The dyestuffs that are most effectively applied according to the present invention are the water-insoluble, oil-soluble dyestuffs that are soluble in aromatic solvents. Particularly good results are obtained with the water-insoluble, oil-soluble dyestuffs of the azo or anthraquinone series. Suitable specific dyestuffs include, but are not limited to, those appearing in Table I hereunder. Table I gives the chemical name and the name and number of the dyestuff according to the Colour Index, 2nd edition, 1956, as well as the hue obtained when the polyolefin is dyed according to the present invention.

TABLE I

| Colorant | C.I. No. | C.I. Name | Hue of Dyed Polyolefin |
|---|---|---|---|
| 4-phenylazo-N-dimethylaniline | 11020 | Solvent Yellow 2 | Greenish Yellow. |
| 6-(p-acetylamino)-phenylazo-p-cresol | 11855 | Disperse Yellow 3 | Reddish Yellow. |
| 3-(m-nitrophenylazo)-4-hydroxy-1-methyl carbostyril | 12970 | do | Greenish Yellow. |
| 4-o-tolylazo-o-toluidine | 11160 | Solvent Yellow 3 | Reddish Yellow. |
| 1-(o-tolylazo)-2-naphthol | 12100 | Solvent Orange 2 | Reddish Orange. |
| 1-methylaminoanthraquinone | 60505 | Disperse Red 9 | Bluish Red. |
| 1-anilinoanthraquinone | 60510 | Disperse Red 22 | Do. |
| 4'-o-(tolylazo)-1-(2',5'-xylylazo)-2-naphthol | 26120 | Solvent Red 26 | Do. |
| 1,4-diaminoanthraquinone | 61100 | Disperse Violet 1 | Reddish Blue. |
| 1,4-diamino-2-methoxyanthraquinone | 62015 | Disperse Red 11 | Bluish Red. |
| 4-p-toluidino-N-methyl-1-(N)-9-anthrapyridone | 68210 | Solvent Red 52 | Do. |
| 1-(m-xylylazo)-2-naphthol | 12140 | Solvent Orange 7 | Reddish Orange. |
| 1,5+1,8-di-(p-toluidino)-anthraquinone | 61705 | Solvent Violet 14 | Reddish Blue. |
| 1,4,5,8-tetraminoanthraquinone | 64500 | Disperse Blue 1 | Greenish Blue. |
| 1,4-di-(p-toluidino)-anthraquinone | 61565 | Solvent Green 3 | Bluish Green. |
| 1,4-di-(ethanolamino)-5,8-dihydroxyanthraquinone | 62500 | Disperse Blue 7 | Greenish Blue. |

As we have noted, the dye liquor of the invention comprises 0.01–1% by weight of the water-insoluble, oil-soluble dyestuff, 0.05–5% by weight of an inert solvent selected from the group consisting of volatile liquid hydrocarbons, polar haloalkanes and water-soluble amides, 1–10% by weight of an emulsified organic phosphite and the remainder water.

The choice of solvent and the quantity of solvent used in the dye liquor are of particular importance. The solvent must be effective in dissolving the dyestuff, inert to the phosphite carrier, and sufficiently volatile so that during the dyeing operation substantially all of it is boiled off. If a considerable amount of solvent is allowed to remain in the fiber, objectionable odors are present in the dyed product. The useful solvents are the volatile liquid hydrocarbons including alkanes, e.g., hexane, pentane and gasoline, aromatics and lower alkyl substituted aromatics, e.g., benzene, toluene and xylene, and hydroaromatics, e.g., tetralin; polar haloalkanes, e.g., chloroform, tetrachloroethane and methyl chloroform; and water soluble amides, e.g., dimethylformamide and dimethylacetamide. It is surprising that such solvents as nitrobenzene, trichlorobenzene and carbon tetrachloride, which are good solvents for the dyestuffs, do not function in the invention. Also unsuitable are methanol, isopropyl alcohol, propylene glycol, cyclohexanone, ethyl acetate and the like. Among the useful solvents, toluene is preferred, as it is capable of providing shades of color on the dyed polymer of satisfactory depth, including heavy shades.

The amount of solvent used ranges between 0.5–5% of the total weight of dye liquor. If the amount of solvent present is less than 0.5%, it does not effectively dissolve the dyestuff. If the solvent is present in an amount greater than 5%, it becomes very difficult to get rid of the solvent during the dyeing operation, thus creating solvent elimination problems such as those that plagued the prior art workers and that are overcome by the method of this invention.

In order to more easily dissolve the dyestuff, the inert solvent can be diluted with a lower aliphatic ketone such as acetone, methylethyl ketone, isopropyl methyl ketone and the like. Whether or not the ketone diluent is used, the total amount of solvent present in the dye liquor should not exceed 5% by weight. Of the 0.5–5% by weight solvent present, up to 50% of the total can be ketone diluent.

The particular dyestuff desired is dissolved in the solvent or in the solvent containing the ketone diluent in an amount corresponding to 0.1–1% of the total dye liquor. If less than about 0.01% dyestuff is used, the resulting dyeing is too light in shade; if greater than about 1% is used, there is a possibility of crocking, i.e., the transfer of color resulting from the rubbing of the dyed goods against other goods or material.

The solvent solution of dyestuff is emulsified in the dye liquor using as a carrier an aqueous emulsion of an organophosphite. Suitable organophosphites are aryl phosphites, e.g., triphenyl phosphite, didecyl phenyl phosphite, dibutyl phenyl phosphite and trinaphthyl phosphite; lower alkaryl phosphites, e.g., trixylyl phosphite and tricresyl phosphite; or alkyl phosphites wherein the alkyl group contains from 5–10 carbon atoms, e.g., triisooctyl phosphite, neopentyl phosphite and tricyclohexyl phosphite. The phosphite is added to the solvent solution, after the addition of the dye, in an amount corresponding to 1–10% by weight based upon the total weight of the dye liquor.

The phosphite is added in the form of an aqueous emulsion. The emulsion is prepared by admixing the phosphite with a suitable emulsifying agent, preferably an anionic or nonionic emulsifying agent, in an amount equal to 50–150% by weight based upon the weight of the phosphite, along with sufficient water to form an emulsion or, if desired, the total amount of water required to provide the final dye liquor having the desired concentration of dyestuff. The phosphite can be easily emulsified by adding thereto emulsifying agent and an amount of water ranging between 2–10 times the weight of phosphite.

Any anionic or nonionic emulsifying agent is suitable for emulsifying the phosphite. Useful emulsifying agents include the alkali metal salts of alkylaryl sulfonates, the salts of sulfate esters of alkyl phenoxy polyoxyethylene alkanols, long chain hydrocarbon alkali metal sulfonates, the alkali metal acyl alkyl taurates, mono-alkyl biphenyl monosulfonate salts, dialkylphenyl phenyl disulfonate salts, polymerized salts of alkyl naphthalene sulfonic acids, alkylsulfate salts, alkyl amine alkane sulfonates, polyoxyethylene alkyl ethers and thioethers, fatty alcohol ethylene oxides, polyoxyethylene alkyl phenols, alkyl phenoxy polyoxyethylene alcohols, polyoxyethylene esters of mixed fatty and rosin acids and the like. Because of their commercial availability, the alkali metal alkylaryl sulfonates and alkyl amine alkane sulfonates are preferred.

Within the limits specified above, there is for each dyestuff an optimum ratio of solvent to phosphite. Generally, there is present about twice as much phosphite as solvent. After the phosphite emulsion has been admixed with a solvent, water is added, if necessary, to dilute the liquor to provide the proposed concentration of dyestuff.

The dyeing operation is accomplished by immersing the polyolefin in the dye liquor prepared as described hereabove and dyeing at a temperature between about 75° C. to the boiling point of the liquor. Within this temperature range, the solvent volatilizes during the dyeing operation. The length of time for dyeing depends upon the time required for reaching a desired depth of shade or exhausting the color from the liquor, which may take from one-half hour to one hour. As noted hereabove, the dye bath contains from 0.01–1% by weight dyestuff; the amount of dye generally corresponds to 0.125–3% based upon the weight of the material to be dyed.

Conveniently, dyeing is accomplished by heating the dye liquor up to about 75° C., immersing the fiber and continuing heating at a temperature between 75° C. and the boiling point of the liquor until the desired strength of dye on the material is reached and the shade is matched. The material is then removed from the liquor, rinsed and soaped with any suitable soap or detergent. The material is rinsed again and then dried. The resulting dyeings are excellent with respect to the depth of shade and are fast to light, fast to soap and resistant to crocking.

The method of the invention has a number of practical advantages. The dye liquor is a stable emulsion which can be used over a long period of time after its preparation. The liquor itself contains no chemicals which are harmful to the user, and the problems of the prior art workers relating to the removal of solvents from the dye product have been eliminated. A wide range of commercially available colors can be applied successively by the method of the invention.

Our invention is further illustrated by the following examples:

*Example I*

A 100 mg. quantity of C.I. Solvent Red 26 was dissolved in 15 ml. of a 50–50 mixture of methylethyl ketone and toluene and then mixed with 35 ml. of an emulsion of triphenyl phosphite prepared by emulsifying 10 parts by weight triphenyl phosphite with 10 parts of the anionic emulsifying agent G3300 (described by its manufacturer as an alkyl amine alkane sulfonate) and 80 parts by weight water. The emulsified mixture was diluted with 300 ml. of water to form the dye liquor. The dye liquor was heated to a temperature of 80° C. and a 10 gram skein of polypropylene was worked therein for 45 minutes while maintaining the temperature at 80° C. The dyed material was then rinsed, soaped hot, rinsed and dried. The dyed polypropylene was a deep red shade having excellent fastness to light, soaping and crocking.

*Example II*

A 50 mg. quantity of 1-phenylazo-2-naphthol (C.I. Solvent Yellow 14) was dissolved in 15 ml. of a 50–50 mixture by weight of methylethyl ketone and toluene. An emulsion of triphenyl phosphite was prepared as described in Example I and 30 ml. thereof was added to the toluene solution of dyestuff. The mixture was diluted with 280 ml. of water to form the final dye liquor, and the temperature was raised to 80° C. A 10 gram piece of polypropylene cloth was worked in this dye bath for 30 minutes, removed, rinsed and soaped, rinsed and dried. The polypropylene cloth was a bright orange color which was fast to light, soaping, perspiration and crocking.

*Example III*

The procedure of Example II was substantially repeated with the exception that benzene was substituted as a solvent. An orange dyeing was obtained which, although lighter in shade than that of Example II, was fast to light, soaping and crocking.

*Example IV*

A 200 mg. quantity of 1-hydroxy-4-(toluidino)-anthraquinone (C.I. Solvent Violet 13) was dissolved in 20 ml. of a 50–50 mixture of methylethyl ketone and toluene. A 35 ml. quantity of triphenyl phosphite emulsion, prepared as described in Example I, was added. The mixture was diluted with 30 ml. of water, and the temperature of the liquor was brought up to 80° C. A 10 gram skein of polypropylene yarn was worked in this bath for 45 minutes. The yarn was removed, rinsed, soaped, rinsed and dried. A full reddish blue of excellent light fastness, crock fastness, and wash fastness was obtained on the polypropylene yarn.

*Example V*

The procedure of Example IV was substantially repeated with the exception that the ketone diluent was omitted. A full reddish blue of excellent light fastness, crock fastness and wash fastness was obtained on the polypropylene yarn.

*Example VI*

A 100 mg. quantity of 1,4-di-(isopropylamino) anthraquinone was dissolved in 20 g. of a 50–50 mixture of methylethyl ketone and xylene and then mixed with 20 g. of an emulsion of triphenyl phosphite prepared as described in Example I. The emulsified mixture was diluted with 250 ml. of water to form the dye liquor. The dye liquor was heated to a temperature of 85° C., and a 10 g. skein of polypropylene fiber was worked therein for 1 hour while maintaining the temperature at 85° C. The dyed material was then soaped, rinsed and dried. The colored polypropylene was a light blue shade having excellent fastness to light, soaping and crocking.

*Example VII*

A 100 mg. quantity of C.I. Solvent Red 26 was dissolved in 20 ml. of a 50–50 mixture of methylethyl ketone and tetralin and then mixed with 20 g. of an emulsion of triphenyl phosphite prepared as described in Example I. The emulsified mixture was diluted with 250 ml. of water to form the dye liquor. The dye liquor was heated to a temperature of 85° C., and a 10 g. skein of polypropylene fiber was worked therein for 1 hour while maintaining the temperature at 85° C. The dyed material was then soaped, rinsed and dried. The colored polypropylene was a light red shade having excellent fastness to light, soaping and crocking.

*Example VIII*

A 100 mg. quantity of 1-anilinoanthraquinone was dissolved in 20 ml. of a 50–50 mixture of methylethyl ketone and dimethyl formamide and then mixed with 20 g. of an emulsion of triphenyl phosphite prepared as described in Example I. The emulsified mixture was diluted with 250 ml. of water to form the dye liquor. The dye liquor was heated to a temperature of 85° C., and a 10 g. skein of polypropylene fiber was worked therein for 1 hour while maintaining the temperature at 85° C. The dyed material was then soaped, rinsed and dried. The colored polypropylene was a pastel red shade having excellent fastness to light, soaping and crocking.

It is claimed:

1. A method of coloring polypropylene comprising immersing said polypropylene in a dye liquor at a temperature between 75° C. and the boiling point of said liquor, said liquor comprising (1) 0.01–1% by weight, based upon the weight of said liquor, of a water-insoluble, oil-soluble dyestuff dissolved in an inert solvent selected from the group consisting of volatile liquid hydrocarbons, polar haloalkanes and polar water-soluble amides, the amount of said solvent being 0.5–5% by weight of said liquor, (2) an aqueous emulsion of an organic phosphite selected from the group consisting of triaryl phosphites, tri lower alkaryl phosphites and trialkyl phosphites wherein the alkyl group has from 5–10 carbon atoms, the amount of said phosphite being from 1–10% by weight based on the weight of said liquor, and (3) sufficient water to provide the above-indicated concentration of said dyestuff.

2. Method according to claim 1 wherein the inert solvent contains up to 50% by weight ketone diluent.

3. A method of coloring polypropylene comprising immersing polypropylene in a dye liquor at a temperature between 75° C. and the boiling point of said liquor, said liquor having been prepared by dissolving 0.01–1% by weight, based upon the weight of said liquor, of a water-insoluble, oil-soluble dyestuff in an inert volatile liquid hydrocarbon solvent, the amount of said solvent being 0.5–5% by weight of said liquor, adding thereto an aqueous emulsion of an organic phosphite selected from the group consisting of triaryl phosphites, tri lower alkaryl phosphites and trialkyl phosphites wherein the alkyl group has from 5–10 carbon atoms, the amount of said phosphite being from 1–10% by weight based on the weight of said liquor, and sufficient water to provide the above-indicated concentration of said dyestuff.

4. A method of coloring polypropylene comprising immersing said polypropylene in a dye liquor at a temperature between 75° C. and the boiling point of said liquor, said liquor comprising (1) 0.01–1% by weight, based upon the weight of said liquor, of a water-insoluble, oil-soluble dyestuff dissolved in toluene, the amount of toluene being 0.5–5% by weight of said liquor, (2) an aqueous emulsion of triphenyl phosphite, the amount of triphenyl phosphite being from 1–10% by weight based on the weight of said liquor, and (3) sufficient water to provide the above-indicated concentration of said dyestuff.

References Cited in the file of this patent

UNITED STATES PATENTS

| | | |
|---|---|---|
| 2,259,515 | Croft et al. | Oct. 21, 1941 |
| 2,516,980 | Gray et al. | Aug. 1, 1950 |
| 2,524,811 | Koberlein | Oct. 10, 1950 |
| 2,649,435 | Stanin et al. | Aug. 18, 1953 |
| 3,039,840 | Sawaya | June 19, 1962 |

FOREIGN PATENTS

| | | |
|---|---|---|
| 809,495 | Great Britain | Feb. 25, 1959 |

OTHER REFERENCES

Finch: Fibres and Plastics, January 1960, pp. 14–16, 8–55 BU.

UNITED STATES PATENT OFFICE
CERTIFICATE OF CORRECTION

April 7, 1964

Patent No. 3,128,146

Joseph Bianco et al.

It is hereby certified that error appears in the above numbered patent requiring correction and that the said Letters Patent should read as corrected below.

Columns 1 and 2, TABLE I, third column, line 3 thereof, for "do" read -- Disperse Yellow 5 --; column 6, line 19, for "50-10" read -- 5-10 --.

Signed and sealed this 6th day of July 1965.

(SEAL)
Attest:

ERNEST W. SWIDER
Attesting Officer

EDWARD J. BRENNER
Commissioner of Patents